United States Patent [19]

Archer

[11] Patent Number: 4,465,310

[45] Date of Patent: Aug. 14, 1984

[54] CLAMPING AND HIGH PRESSURE CONTAINMENT DEVICES

[75] Inventor: Lee A. Archer, Asheville, N.C.

[73] Assignee: Akzona Incorporated, Asheville, N.C.

[21] Appl. No.: 433,058

[22] Filed: Oct. 6, 1982

[51] Int. Cl.³ .............................................. F16L 17/04
[52] U.S. Cl. .................................... 285/373; 285/419; 285/420; 285/DIG. 13; 138/97
[58] Field of Search ............... 285/419, 420, 373, 178, 285/320, DIG. 21, 414; 24/263 DA; 72/56; 73/46; 29/237; 138/97, 99

[56] References Cited

U.S. PATENT DOCUMENTS 3,371,521  3/1968  Hauk ................................. 285/414 X
4,244,208  1/1981  Hauk et al. ............................. 73/46

FOREIGN PATENT DOCUMENTS 2231915 12/1974  France ................................. 285/420

Primary Examiner—Dave W. Arola
Attorney, Agent, or Firm—David M. Carter; Francis W. Young; Alan R. Stempel

[57] ABSTRACT

An improved split body clamping or pressure containment device is provided where the body members are retained together through the use of a plurality of double ended links. The ends of each of the links are juxtaposed to and associated respectively with each of the clamping body members. Rotary cams mounted on shafts which pass through the ends of the links compress the body members together and cause other movements of one of the body members and the links.

32 Claims, 11 Drawing Figures

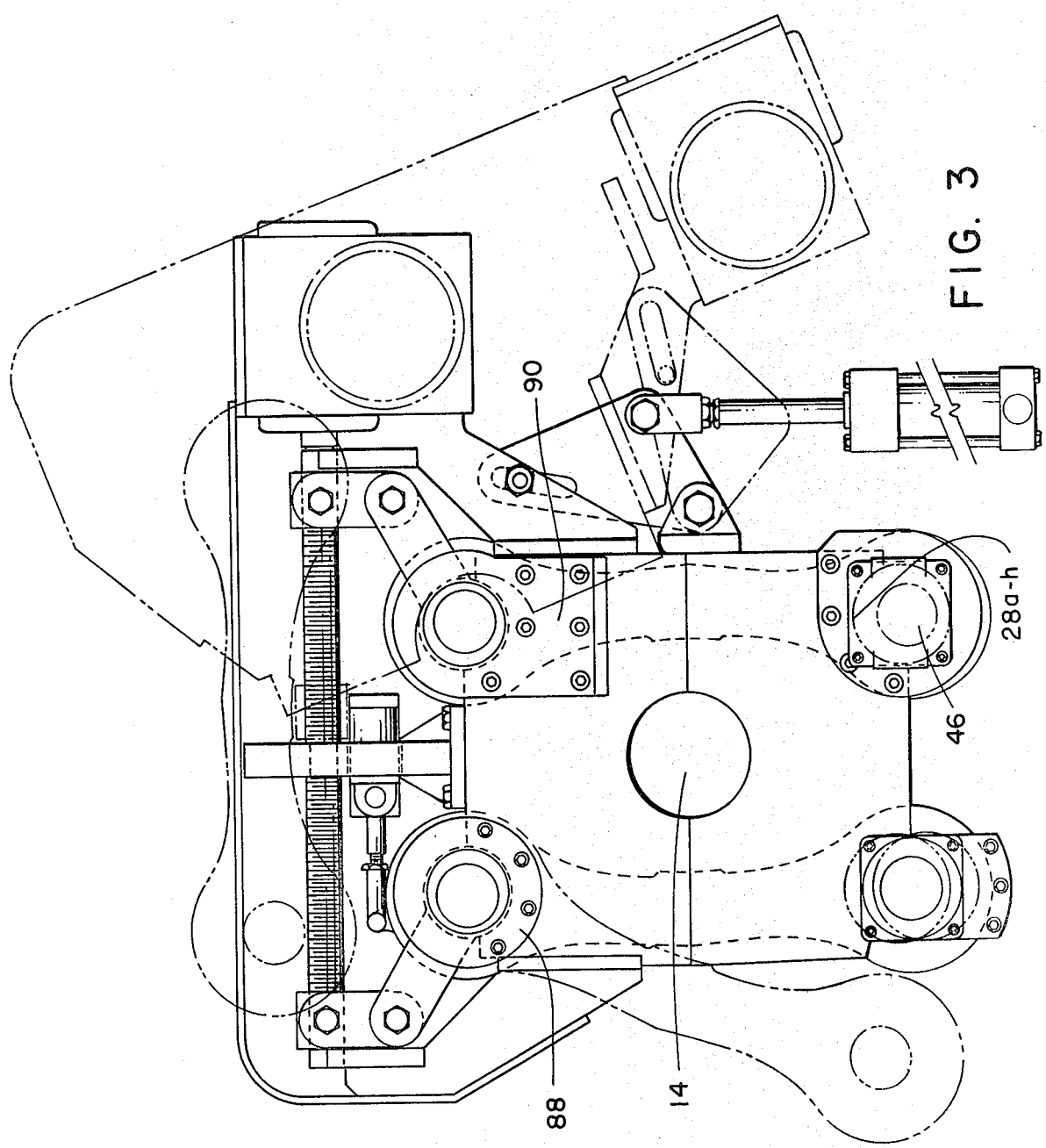

CLAMPING AND HIGH PRESSURE CONTAINMENT DEVICES

FIELD OF THE INVENTION

The present invention relates to clamping and high pressure containment devices, particularly devices suited for clamping cylindrical objects such as pipe, and for containing highly pressurized fluid or gas in cylindrical chambers for shrinking a sleeve over a pipe joint.

BACKGROUND OF THE INVENTION

In a variety of engineering applications, clamping or containment devices are used for exerting an inwardly radial pressure upon a generally cylindrical object or body. For example, sleeve-like clamping devices are used, especially in petroleum and gas transmission applications, to make butt joints between adjoining sections of a pipeline where conventional welding techniques cannot conveniently or economically be employed. Similarly, clamping devices are used to effect emergency repairs on pipeline ruptures. In a somewhat different sort of application, it is sometimes necessary to contain a highly pressurized fluid or gas, produced by, say, an explosion, in a cylindrical chamber which must, nevertheless, be capable of being opened for access to the interior thereof. An example of such a device might be the hydrostatic pipe splicing apparatus disclosed in U.S. Pat. No. 4,330,918.

One well known clamping device for the above purposes is the split-sleeve, exemplary versions of which are shown in Prior Art FIG. 1. As can be seen, this type of device generally comprises a cylindrical or sleeve-like body which is longitudinally split into two mating halves 1 and 2 which are adapted to be joined together by bolts 3 in a clamping relationship.

It has long been recognized that, despite its utility, the split-sleeve clamp possesses a number of limitations and disadvantages. For one thing, it is a time consuming matter to tighten the many bolts of a split-sleeve clamp, a distinct disadvantage when the clamp is being used in a hostile environment, for example, when it is being applied by divers to an underwater pipeline. Further, if the clamp is to be subjected to any considerable amount of stress, it is critical that the bolts be equally torqued in order to avoid localization of stress and the ensuing phenomenon whereby the bolts, one-by-one, "unzip". In a preferred version of this device, shown in exemplary fashion in FIG. 1, the bolts pass through the so-called "average stress line" of a thick walled cylinder of the clamping body so that the clamp is able to maintain circularity under stress. Doing this, however, brings the bolt holes extremely close to the inside bore of the clamping device and, under high internal pressure, the weakened bore wall may rupture. Still another structural defect resides in the fact that the bolts used to fasten the clamping device halves together must be spaced fairly widely apart in order to leave room for their heads or nuts 4. This means that the total cross sectional area of the bolts is relatively small in comparison to the bearing surface area which they require. Accordingly, there is an inherent limitation in the strength of a split-sleeve clamp which is held together using bolts, and devices of this type simply cannot be used in certain extreme applications.

In view of the above mentioned drawbacks of bolted split-sleeve clamping and containment devices, it is the general object of the present invention to provide an improved clamping or containment device which is substantially free of these limitations.

It is a more particular object to provide a clamping or containment device which is able to exert clamping forces far in excess of those practically achievable with bolted split sleeve devices of equivalent size and weight.

Another object is to provide a clamping or containment device which is able to maintain circularity by the direction of clamping force through the device average stress line, and which yet possesses a bore wall of acceptable thickness.

Still another object is the provision of a clamping or containment device which does not utilize a plurality of bolts which must be uniformly tightened and which, accordingly, may be used more rapidly and easily than existing devices relying on bolts.

As still further objects, it is the intent of the present invention to provide a novel clamping apparatus which may be applied to a number of tasks in various environments. Thus, it is a particular object of the invention to provide a clamping device to clamp butted splice sections of a pipeline or to patch ruptures in a pipeline. Another particular object is to provide an improved high pressue containment vessel which is suitable for use in the practice of the general hydrostatic pipe splicing method taught by U.S. Pat. No. 4,327,471.

SUMMARY OF THE INVENTION

The above stated objects are satisfied by the present invention, which provides a novel clamping or high pressure containment device structure. Although the preferred embodiment described herein is particularly suited for clamping cylindrical objects or for containing a highly pressurized mass of liquid or gas in a cylindrical chamber, it will be understood that clamping or containment devices according to the invention may be constructed for clamping or containing non-cylindrical objects or pressurized masses utilizing the principles taught herein.

As its primary feature, the present invention provides split body clamping or containment devices in which the body members are retained together in clamping relationship through the use of double-ended links, rather than bolts as in conventional devices. The first ends of each of the links are juxtaposed to and associated with one of the clamping body members while the second ends of the links are juxtaposed to and associated with the other of the body members. A system of cams, preferably rotary cams, mounted on shafts passing through eyes in the ends of the links, is provided for compressing the clamping body members together between the ends of the links and thereby forcing them into tightly clamping relationship when the cams are moved to a predetermined position. Unlike devices employing bolts, there is no inherent limitation on the cross-sectional area of the links and, accordingly, devices with appropriately sized links are capable of exerting clamping forces heretofore unachievable with devices of comparable size and weight.

As a further feature in devices according to the invention including an extensive number of cams, actuation means may be provided for simultaneously moving entire groups of cams to the predetermined or clamping position, thus making it possible to be clamped in an extremely rapid manner. The employment of such a system also advantageously obviates the possibility that there may be operator error in tightening of the device which might lead to destructive localization of stresses, as was the case of bolted clamps. Each link is automatically uniformly tensioned by the system of cams.

A feature of the preferred embodiment described herein, which is specifically adapted for clamping cylindrical objects or forming pressurized cylindrical chambers, is that the resultant compressive forces developed by the links are directed through the average stress line of the clamping body, insuring that the body will maintain its circularity. Further, the use of links, rather than bolts, allows the above objective to be accomplished without a substantial weakening of the bore or chamber walls of the clamping body.

These and other features and advantages of the invention will now be further explained by reference to the drawings and the following detailed description of the preferred embodiments.

BRIEF DESCRIPTION OF THE DRAWINGS

FIG. 3 is an end view of the embodiment shown in FIG. 2 showing the two body halves closed in solid lines and opened in phantom.

DETAILED DESCRIPTION OF THE PREFERRED EMBODIMENTS

The invention will now be explained more fully by describing the structure and operation of one of the preferred embodiments, which is a pipe clamp particularly suited for forming butt joints or for repairing pipe ruptures. It will be understood, however, that this embodiment as well as other embodiments may be applied to different purposes such as for a high pressure containment device.

Figure 1:
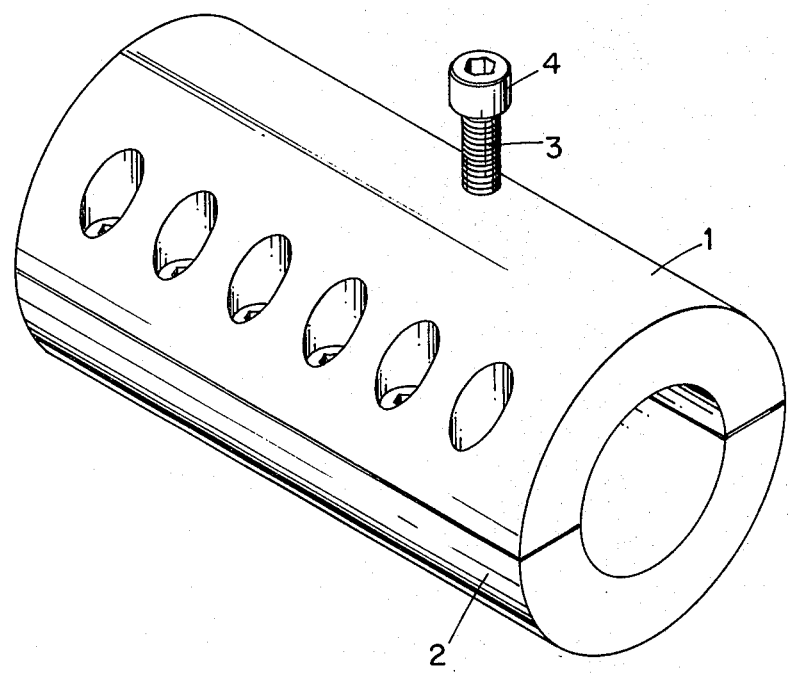
FIG. 1 illustrates a typical bolted, split-cylinder clamping device known in the prior art.
Figure 2:
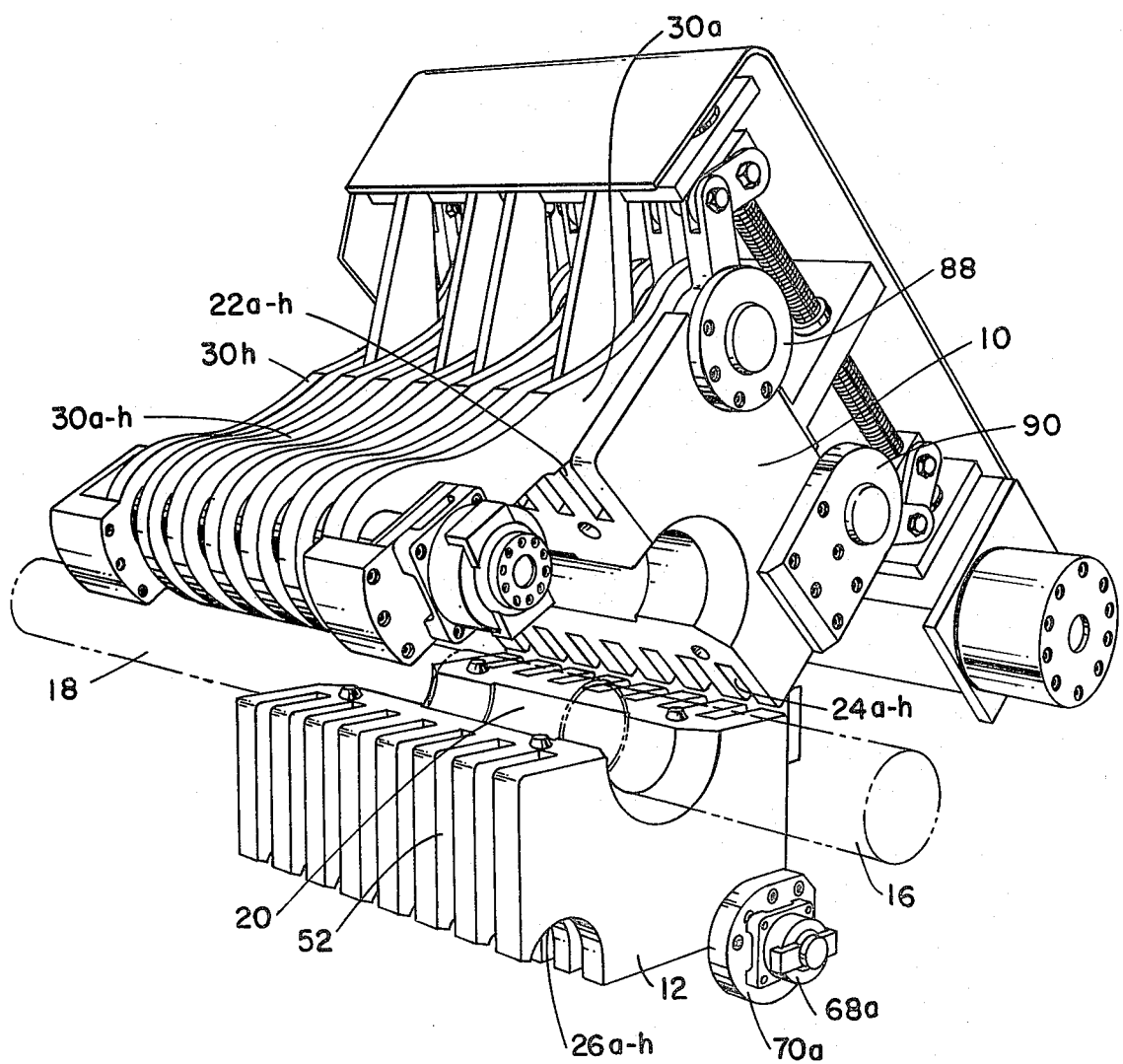
FIG. 2 is a pictorial view of a preferred embodiment of the present invention.

Referring most particularly to FIGS. 2 through 11, it will be seen that the preferred embodiment comprises a clamping body which includes upper and lower members 10 and 12, respectively. (As they are used herein, terms such as upper, lower, right or left refer to an arbitrary frame of reference.) The members 10 and 12, when brought into clamping relationship together define a through cylindrical bore 14 for receiving a cylindrical pipe (shown in phantom) to be clamped. For purposes of illustration, the clamp is depicted in FIG. 2 as being used to form a butt joint between two lengths of pipe 16 and 18, which have been inserted, in abutting relationship, into the bore 14. A sealing gasket 20 preferably lines the bore in order to form a leak proof joint. This gasket may be rubber or soft metal sleeve clamped about the butt joint or leak in the pipe.

Although the clamping body formed by the two members 10 and 12 and the through bore 14 may be regarded as functioning essentially as a thick-walled cylinder, it will be noted that extra material is added to the periphery of the cylinder in order to enable the placement of four arrays of concave saddles; an array on the left side of the upper member 10 comprising saddles 22a–h, an array on the right side of the upper member 10 comprising saddles 24a–h, an array on the left side of the lower member 12 comprising saddles 26a–h, and an array on the right side of the lower member 12 comprising saddles 28a–h. The saddles, which function as load bearing surfaces, are paired so that for each saddle on the upper member 10 there is a corresponding saddle on the lower member 12. Thus, for example, saddles 22a and 26a constitute an upper and lower saddle pair. The application of opposing forces to the saddles constituting each of the several saddle pairs urges the upper and lower clamping body members, 10 and 12, into clamping relationship.

The clamping device further comprises a plurality of links, 30a–h and 31a–h, each of which is associated with a given pair of saddles. Thus, for example, link 30a is associated with the pair of saddles 22a and 26a and link 32h is associated with the saddles 24h and 28h. Each of the links has first and second ends, 34 and 36, which are respectively juxtaposable to the upper and lower saddles of the saddle pair with which a particular link is associated.

Upon further explanation of the structure and functioning of the clamping device, it will become apparent that the number of links and saddle pairs employed in a device according to the present invention is a matter of design choice and will depend on the size of the clamp and its application.

Figure 11:
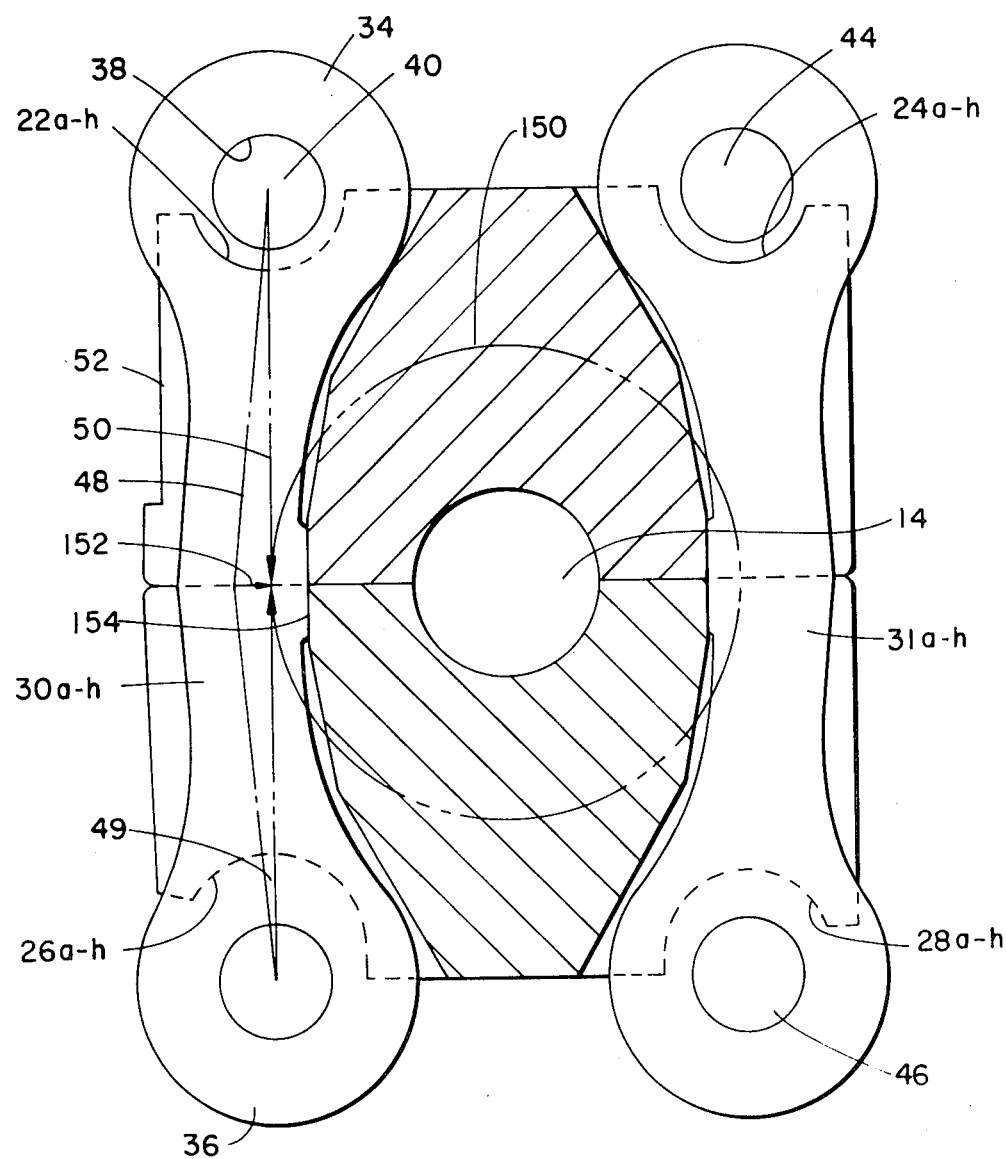
FIG. 11 is a simplified sectional end view of the embodiment of FIG. 3.

For reasons which will also become apparent, each of the links may be slightly curved or V-shaped so that its central axis 48 deviates by a small angle 49 from a line 50 drawn between the centers of the link eyes, as best shown in FIG. 11. Further, when the clamping body is in its fully closed configuration, as it appears in FIG. 9, the links are substantially recessed into channels 52 in the body, which may be seen most clearly in FIG. 2.

In order to facilitate the application of opposing forces to the saddle pair, which urge the upper and lower members 10 and 12 into clamping relationship, means are provided for coupling each of the link ends 34 and 36 to their associated load bearing saddles. In keeping with a general principle of the invention, the coupling means for at least one end of each link includes a cam which is movable to a predetermined position, whereby movement of the cam to the predetermined position moves the end of the link away from its associated load bearing saddle and urges the clamping body members toward each other into clamping relationship. In the preferred embodiment shown, coupling means are employed which provide a cam at both ends of each link.

Figure 4:
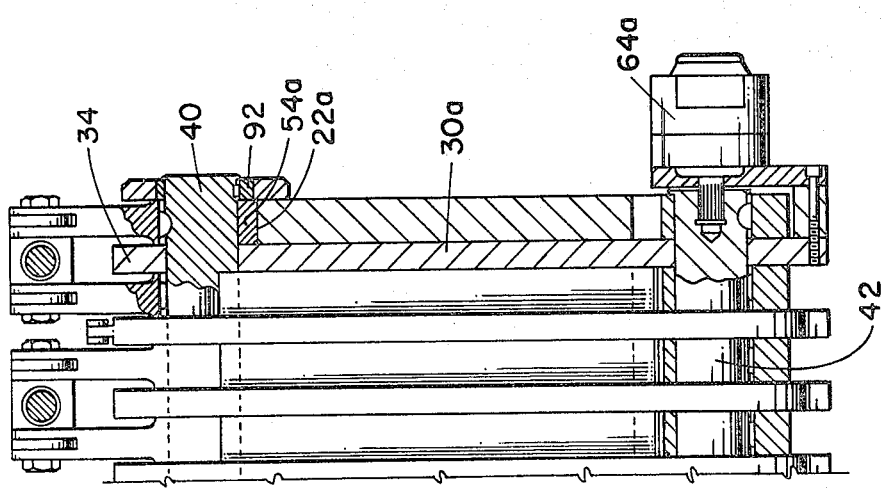
FIG. 4 is a partial side view, in section, of the embodiment shown in FIG. 2.

In accordance with the above, in the preferred embodiment depicted, each of the link ends, 34 or 36, includes an eye 38. A common shaft 40 as shown in FIG. 4 is journaled through the eyes 38 of the upper ends 34 of the links 30a–h and a common shaft 42 is journaled through the eyes 38 of the lower ends 36 of these same links. Similarly, a common shaft 44 is journaled through the eyes 38 of the upper ends 34 of the links 31a–h and another common shaft 46 is journaled through the eyes 38 of the lower ends 36 of these links. Keyed to these four shafts are four sets of rotary cams. Thus, shaft 40 carries a set of cams 54a–h and shaft 44 carries a set of cams 56a–h. Similarly, shaft 42 carries cams 58a–h and shaft 46 carries cams 60a–h. It will be noted that each of the cams is associated with a particular link end. Thus, for example, cam 54a is associated with the end 34 of link 30a. Further, each of the cams is also associated with one of the load bearing saddles, the saddle to which its associated link end may be juxtaposed. Thus, for example, cam 54a is associated with saddle 22a.

Figure 8:
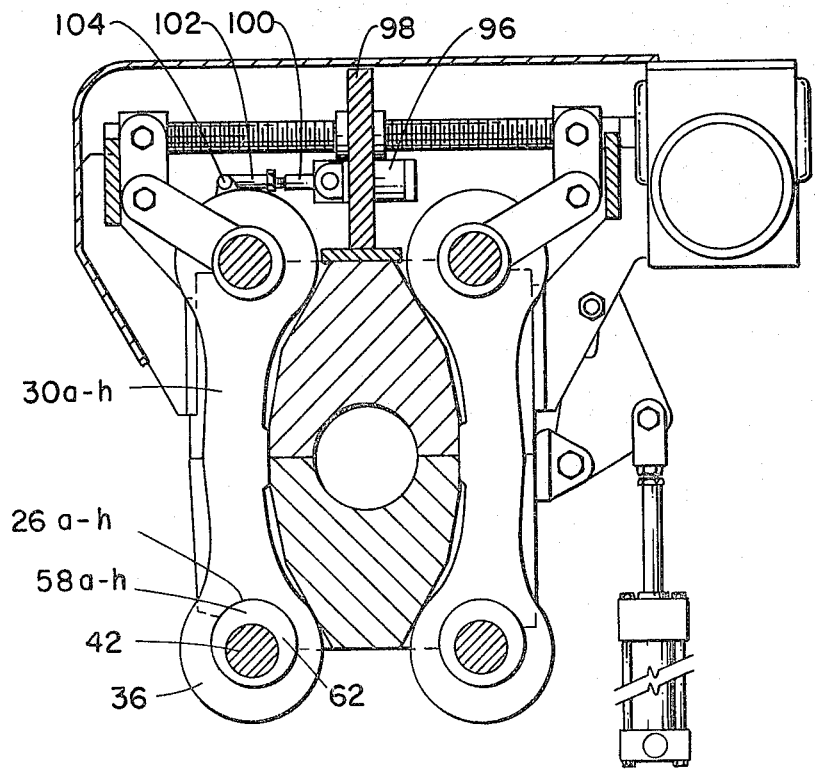

As best seen in FIG. 8, when the cams are rotated so that their lobes 62 are substantially aligned with the central axes 48 of their respective links, each cam forcefully bears against its associated load bearing saddle, coupling the links to the members 10 and 12 and, at the same time, urging the members toward each other into clamping relationship. In preferred embodiments of the invention, such as the one depicted by the drawings, sufficient force is exerted between the cams and their associated load bearing saddles to slightly elongate the links and thus pretension the clamping device so that it can withstand substantial internal parting forces, although such elongation is not shown in the drawings.

Although rotary cams are employed in the preferred embodiment which are juxtaposable to and coact with the saddles, the use of other equivalent cam arrangements is considered to be within the scope of the invention. Thus an equivalent arrangement would be for a cam to work within the eye of a link causing a shaft to which the cam is keyed to rotate about cam's center as the shaft itself is rotated about its axis, causing the shaft to bear against an associated saddle on one of the clamping body members. As a still further alternative, a shaft could carry a conically shaped cam which, upon axial movement of the shaft, bears against an appropriately contoured saddle of a clamping body member.

As will become more apparent, the several groups of cams in the preferred embodiment are somewhat differentiated both in function and structure and the means for rotationally driving the cams are similarly differentiated.

Cams 58a–h are termed latching cams which allow the device to open and close in a clamshell-like fashion. These cams are rotatably driven by being keyed to the shaft 42 which in turn is driven by two rotary actuators 64a and 64b which are located at and splined to the shaft ends. The actuators are respectively affixed to links 30a and 30h by support brackets 66a and 66b.

Cams 60a–h are termed lifting cams which facilitate the elevation and descent of the upper body member 10 as part of an opening and closing sequence of the device. These cams are rotatably driven by being keyed to the shaft 46 which is also driven by a pair of rotary actuators 68a and 68b. In this instance, however, the shafts of the actuators 68a and 68b are splined eccentrically to the shaft 46 so that, when rotated, the axis of the shaft 46 rotates about the axis of the two actuators, as well as about a line drawn through the centers of the cams 60a–h. The actuators 68a and 68b are affixed to the lower body member 12 by respective retaining plates 70a and 70b.

As a result of this affixation of the actuators, it will be noted that the links 31a–h are hingedly secured to the lower body member 12 by means of the shaft 46 which is journaled by the link eyes 38. It will be noted further that rotation of the shaft 46 by the actuators 68a and 68b produces two different effects. Rotation of the shaft 46 to a first angular position causes the cams 60a–h to bear against the saddles 28a–h, coupling the links 32a–h to the saddles and, in concert with the other sets of cams, causing the clamping members 10 and 12 to come together. Rotation to a second position 180 degrees away from the first brings the cams to an uncoupled position and against bearing surface 47 and causes the links 32a–h, acting as connecting rods driven by the crank pin (shaft 46), to move upwardly. As will be seen, this action elevates the body member 10.

Finally, rotary cams 54a–h and 56a–h are pretensioning cams which serve to lock the body members in clamping relationship and to pretension the links. Unlike the other two sets of cams, the pretensioning cams are not driven by the shafts 40 and 44 to which they are keyed. Instead, each pretensioning cam includes an integral lever arm 72 which is attached through a linkage 74 to a nut 76 which travels on a screw 78. The screw 78 is rotationally driven by two hydraulic motors 80 through the intermediary of a worm gear 82 and a pinion gear 84. It will be observed that, in actuality, two pretensioning cams are paired with each nut 76. Although not shown, there are accordingly four nuts 76 on each side of the device and four screws 78, which serve both right and left pretensioning cams. Similarly, there are four sets of worm and pinion gears, 82 and 84, respectively. The four worm gears are splined, in line, on a common shaft 85 which is driven by the two hydraulic motors 80, only one of which is shown. The pretensioning cams 54a–h and 56a–h are keyed to their respective shafts 40 and 44 in order to insure synchronous operation of the cams.

In order to allow hinged attachment of the links to the upper clamping body member 10, the shafts 40 and 44, on which the pretensioning cams are located, are affixed to the upper clamping body member 10 by retaining plates 88 and 90, respectively. However, since the shafts 40 and 44 must be allowed to move somewhat with respect to the member 10, as the pretensioning cams are rotated, dummy cams 92 and 94, keyed respectively to the shafts 40 and 44, are inserted between the retaining plates and the shafts to provide the proper relative motion.

Figure 6:
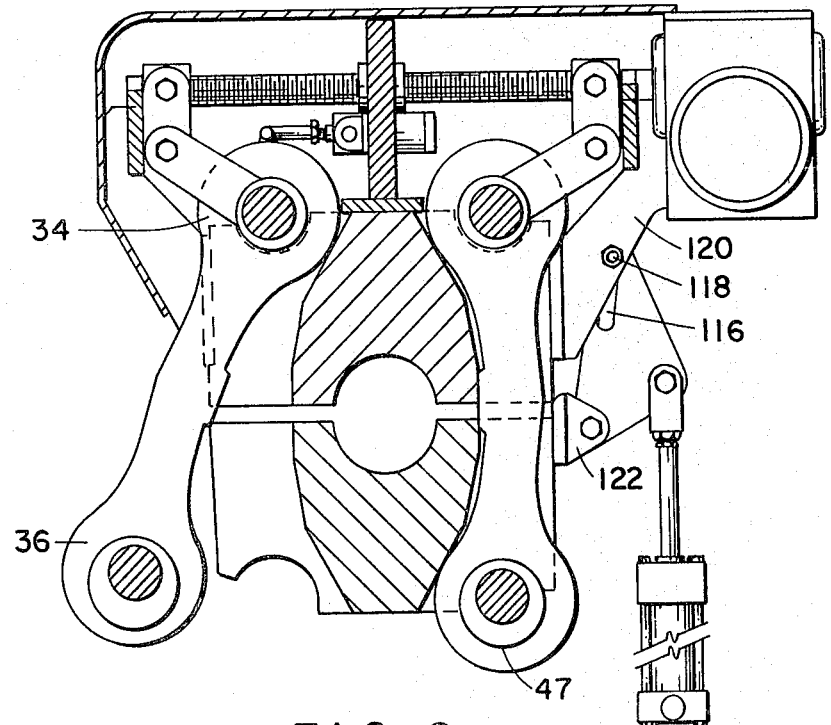

The preferred embodiment further includes a cylinder 96 which is secured to the upper body member 10 by the screw support bar 98. The piston rod 100 of the cylinder 96 is attached by a clevis 102 to a lever arm 104 on one of the links 30a–h. When the latching cams 58a–h are in the unlatched position, an inward stroke of cylinder 96 deploys the lower ends 36 of the links 30a–h outwardly as the upper ends 34 pivot on the shaft 40, as is best seen in FIG. 6. This action allows the two clamping body members 10 and 12 to be opened in clamshell-like fashion. An outward stroke of cylinder 96 returns the links to the closed position.

Lastly, the clamping device according to the preferred embodiment shown also comprises a cylinder 106 which is secured to a base for the clamping device (not shown). The piston rod 108 of the cylinder 106 is pivotably affixed to the upper member 10 by means of a triangular cylinder linkage lever 110 through a clevis 112. The lever 110 in turn is pivotably affixed to a fulcrum lug 114 on the lower body member 12. The lever 110 includes a cam slot 116 and a cam follower 118, affixed to a gear box support bracket 120, rides in the slot. Upon elevation of the upper clamping body member 10 by the elevating cams 60a–h, an inward stroke of the cylinder 106 pulls the upper member over the fulcrum surface 122 of the fulcrum lug 114, causing the two clamping body members 10 and 12 to pivot open in clamshell-like fashion. An outward stroke of the cylinder 106 returns the upper body member 10 to its substantially horizontal starting position.

Figure 5:
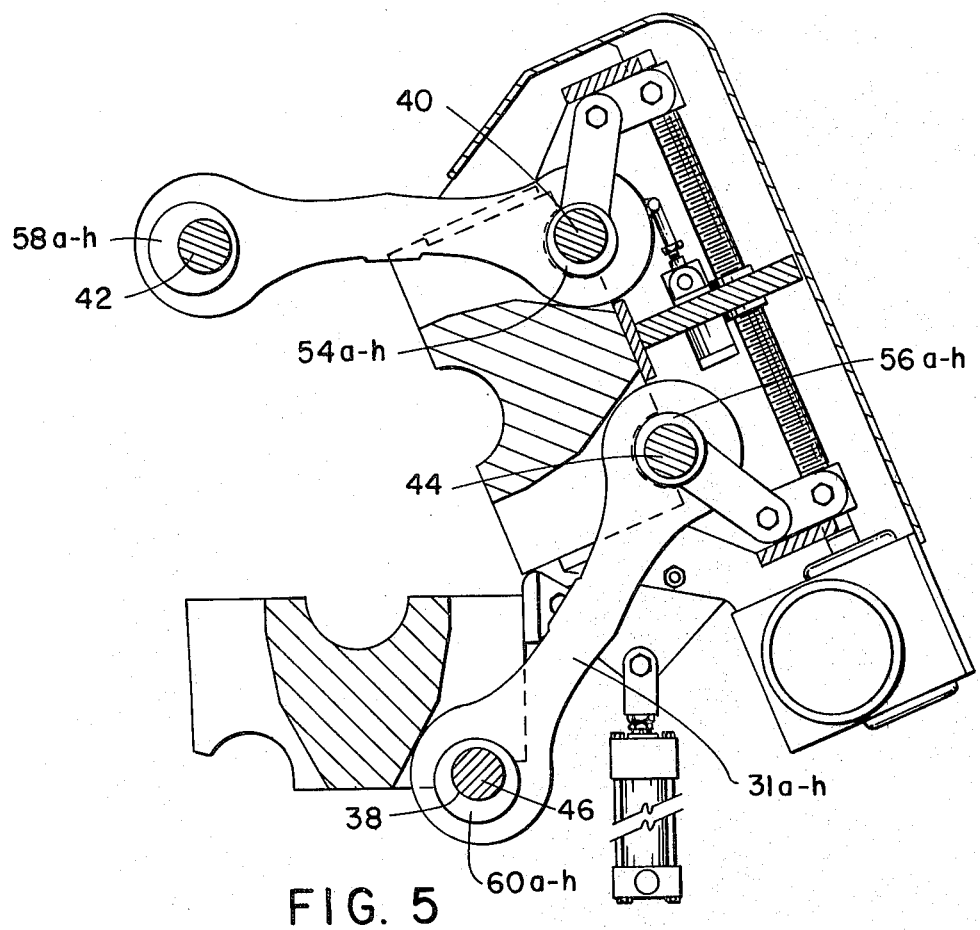
FIGS. 5 through 9 are cross-sectional views of the embodiment shown in FIG. 2 depicting the device at various stages of operation.

At the initial phase of operation, shown in FIG. 5, the two clamping body members 10 and 12 are in an open configuration. This configuration facilitates the insertion of an object to be clamped, pipe sections 16 and 18 shown in FIG. 2, for example, into the bore 14. It will be noted that at this stage the links 30a–h are deployed outwardly from the clamping body, although each link is still pivotably coupled at its top end 34 to the upper clamping body member 10. The links 32a–h, which are pivotally secured to the members 10 and 12, act as a hinge at this juncture.

In the second phase of operation, shown in FIG. 6, cylinder 106 strokes outwardly. This pivots the upper body member 10 back over the fulcrum surface 122 so that the upper member attains a position which is substantially parallel to the lower member 12. It will be noted that, at this point, the lobes 62 of the cams 60a–h are still pointed downward, that is, away from the upper body member 10, and that the shaft 46 is still in an elevated position. Accordingly, when the upper member 10 comes back over, the links 32a–h hold it in a slightly elevated position with respect to the upper member. It will be seen that the elevation of the upper member is necessary in order for it to pivot on the fulcrum surface 122.

Figure 7:
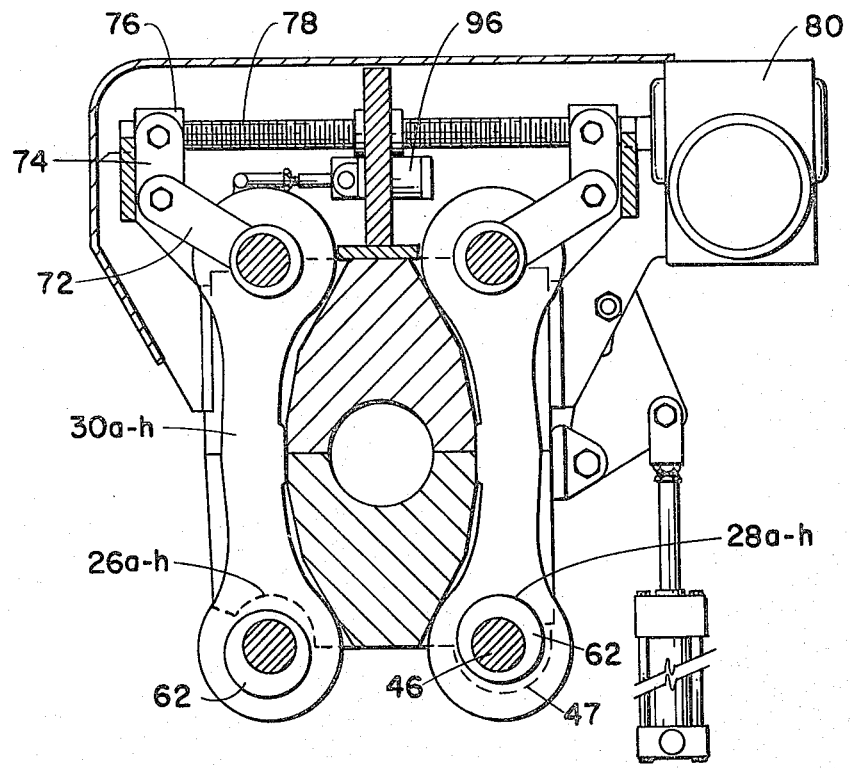

Phases 3 and 4 of machine operation are depicted in FIG. 7. In phase 3, the rotary actuators 68a and 68b turn the shaft 46 approximately 180°. This causes the links 32a–h, and consequently the upper body member 10, to descend. This also causes the cams 60a–h to couple the ends 36 of the links 32a–h to the saddles 28a–h of the lower body member 12. In the fourth phase of operation, the cylinder 96 strokes outwardly, causing the links 30a–h to be pivotaly displaced inwardly. It will be noted that the saddles 26a–h are specially contoured to allow the exit and entry of the cams 58a–h during the swinging action of the links 30a–h.

In a fifth phase of operation, shown in FIG. 8, the rotary actuators 64a and 64b rotate the shaft 42 approximately 180°. This causes the lobes 62 of the cams 58a–h to engage the saddles 26a–h, coupling the lower ends 36 of the links 30a–h to the lower body member 12.

Figure 10:
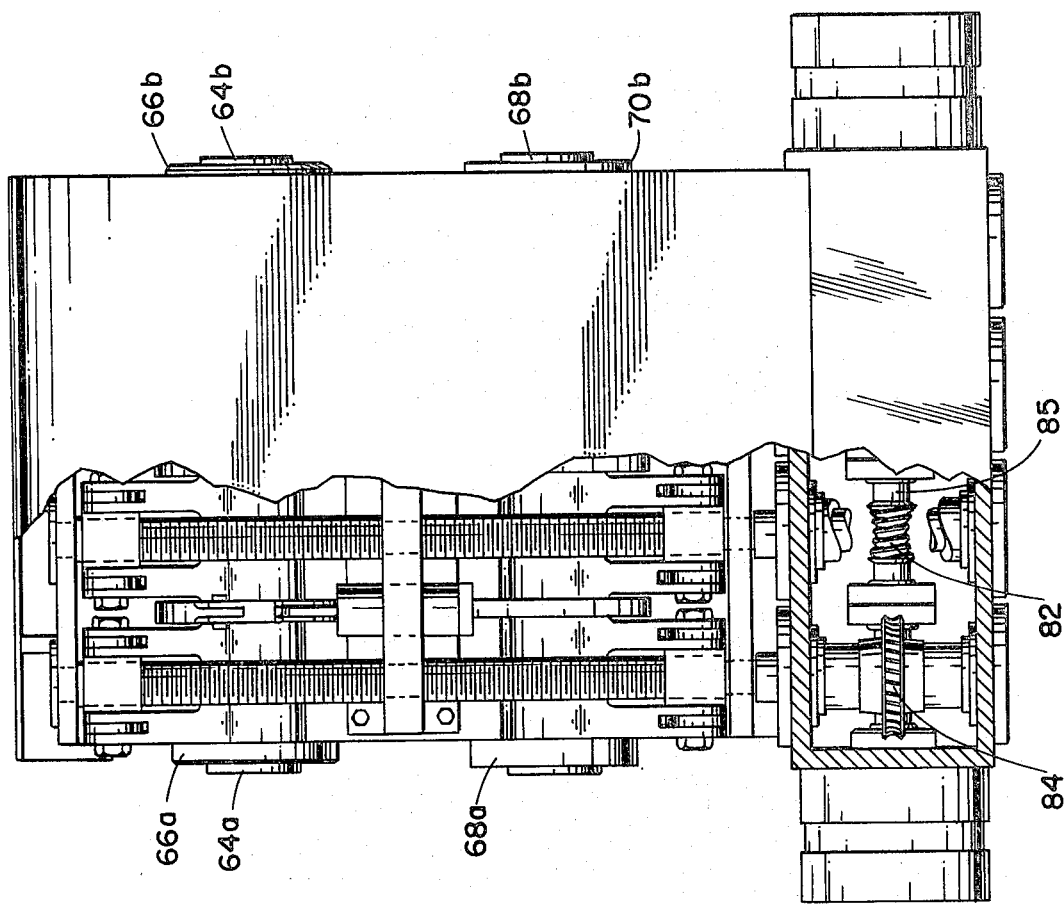
FIG. 10 is a partial top view of the embodiment shown in FIG. 2.
Figure 9:
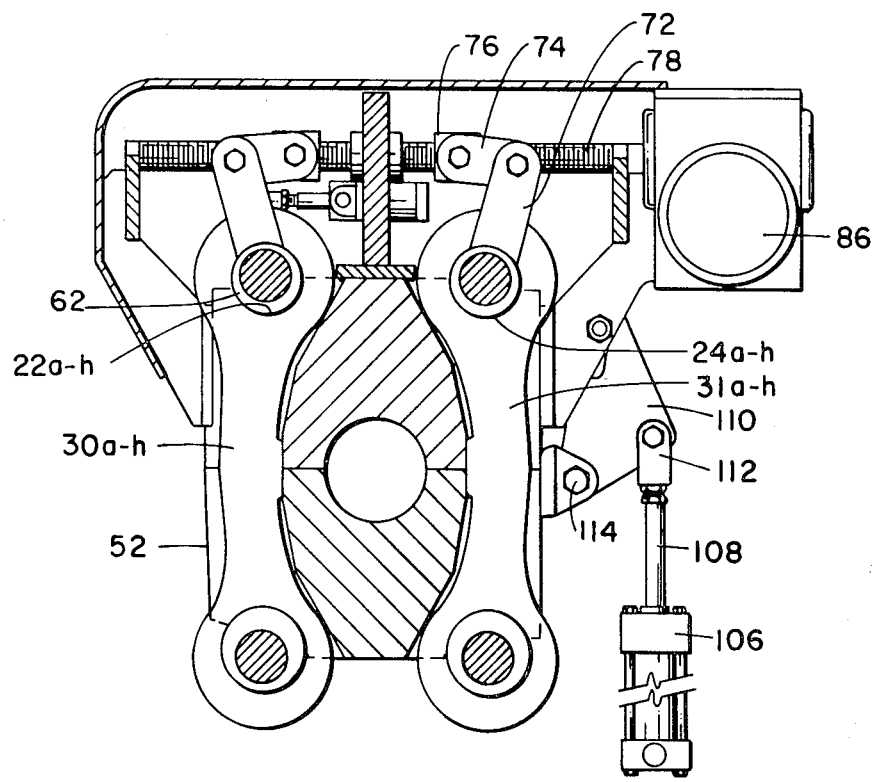

In a sixth and final phase of machine operation, shown in FIG. 9, the clamping body is tightly closed upon the pipe sections (shown in FIG. 2) and the links 30a–h and 31a–h are pretensioned. To accomplish this, as shown in FIG. 10, the hydraulic motors 86 rotate the shaft 85, and consequently the worm gears 82, which in turn drive the pinion gears 84. The pinion gears rotate the screws 78, causing the nuts 76 to travel toward the center of the device. By means of the linkages 74, the lever arms 72 of the presentioning cams 54a–h and 56a–h are drawn toward the center of the device. This causes the lobes 62 of the pretensioning cams to engage the saddles 22a–h and 24a–h, respectively, coupling the upper ends 34 of the links to the upper body member 10 and urging the upper and lower body members, 10 and 12, into tight clamping relationship.

It will be noted that in the preferred embodiment shown, when the clamping device is closed, as shown in FIG. 9, the links advantageously exert clamping forces 50, as shown in FIG. 11, which are tangential to the clamping body average stress line 150. This is accomplished even though the center line 48 of the links does not pass through the average stress line of a thick walled cylinder 150. Although the links could have been made straight so that their center lines would pass through the average stress line, doing so would require that the channels 52 be cut deeper, and this would substantially weaken the integrity of the wall surrounding the bore 14. Instead, in the preferred embodiment, the links are curved or V-shaped. This causes a first component of the clamping force to be exerted upon the clamping body by the links along vectors which coincide with the link center lines 48. A second component of force 152 is exerted against the clamping body by the bosses 154 of the links. The resultant forces are along the lines 50.

Completion of a machine cycle entails following phases 1 through 6 in reverse order and direction of operation.

It will now be appreciated that the device provided by the invention satisfies the above mentioned objects and possesses the stated advantages.

While the foregoing description is of a preferred embodiment, it should be understood that the invention is broader than the embodiment herein described and that the described embodiment is by way of illustration and not of limitation. Accordingly, it will be understood that the appended claims are intended to cover all embodiments which may be made which do not depart materially from the true spirit or scope of the invention.

I claim:

1. A device comprising:
   (a) a clamping body including first and second members which are adapted to be urged together into clamping relationship, said body as a whole, and consequently each of said first and second members, having a first side and a second side, said first member having at least one load bearing surface on its first side and at least one load bearing surface on its second side and said second member having corresponding load bearing surfaces, a load bearing surface on said first member and a corresponding load bearing surface on said second member constituting a load bearing surface pair, whereby the application of opposing forces to the load bearing surfaces of a pair acts to urge said first and second members into clamping relationship; and
   (b) separate means for applying opposing forces to at least one load bearing surface pair on said first side of said clamping body and to at least one load bearing surface pair on said second side of said clamping body, each such means including: a link associated with said load bearing surface pair, said link having first and second ends respectively juxtaposable to said load bearing surfaces of said associated bearing surface pair; and, means for coupling each of said first and second link ends to said respective loadbearing surfaces, said coupling means for at least said first link end including a cam which is movable to a predetermined position, whereby movement of said cam to said predetermined position moves said end of said link relative to its respective load bearing surface and urges said body members toward each other into clamping relationship.

2. A clamping device according to claim 1 wherein said first and second members together define a cylindrical bore for receiving an item to be clamped.

3. A clamping device according to claim 2 wherein forces urging said body portions toward each other into clamping relationship are directed tangentially to the average stress line of said clamping body.

4. A clamping device according to claim 1 wherein at least said first end of said associated link includes an eye and wherein said coupling means for said link end includes, in assembly, a cam mounted on a shaft, said assembly of said shaft and said cam passing through said eye of said link.

5. A clamping device according to claim 4 wherein said shaft is journaled within the eye of said link, said cam is a rotary cam, and wherein rotation of said cam to said predetermined position causes it to bear against the load bearing surface to which said end of said link is juxtaposable, said link thereby applying opposing forces to said load bearing surface pair with which it is associated.

6. A clamping device according to claim 4 wherein said cam is a rotary cam which works in said eye of said link and wherein rotation of said cam to said predetermined position causes said shaft to bear against the load bearing surface to which said end of said link is juxtaposable, said link thereby applying opposing forces to said load bearing surface pair with which it is associated.

7. A clamping device according to claim 1 wherein said coupling means for at least the first end of said associated link comprises a shaft which is secured to said end of said link and a rotary cam rotatably mounted on said shaft, wherein rotation of said cam to said predetermined position causes it to bear against the load bearing surface to which said end of said link is juxtaposable, said link thereby applying opposing forces to said load bearing surface pair with which it is associated.

8. A clamping device according to claim 1 wherein said cams are simultaneously movable to said predetermined position.

9. A clamping device comprising:
(a) a clamping body having a substantially cylindrical bore for receiving an object to be clamped, said body being longitudinally split by a first plane containing the axis of said bore into separable upper and lower clamping body members which are adapted to be urged together into clamping relationship, said clamping body as a whole, and consequently each of said upper and lower members, having a right and a left side defined by a second plane containing the axis of said bore and substantially normal to the first, said upper member having at least one right and one left load bearing surface and said lower member having corresponding load bearing surfaces, a load bearing surface on said upper member and a corresponding load bearing surface on said lower member constituting a load bearing surface pair, whereby the application of opposing forces to the load bearing surfaces of a pair acts to urge said upper and lower members into clamping relationship; and
(b) means for applying opposing forces to at least one of said left and one of said right load bearing surface pairs, said means including: a link associated with each such load bearing surface pair, each such link having upper and lower ends respectively juxtoposable to said upper and lower load bearing surfaces of its associated load bearing surface pair, each link end having an eye therethrough; a shaft journaled within each of said link eyes; a rotary cam associated with each of said link ends, each such cam being rotatably mounted on the shaft journaled through the eye of its associated link end; and, actuation means for rotating said cams; rotation of said cams associated with said ends of said links to predetermined positions causing the lobes of said cams to bear against the load bearing surfaces associated with the ends of said links, whereby said upper and lower members are compressed between said ends of said links and are urged toward each other into clamping relationship.

10. A clamping device according to claim 9 wherein each of said links are somewhat arched whereby opposing forces applied to said load bearing surfaces are directed substantially tangentially to the average stress line of said clamping body.

11. A clamping device according to claim 9 including a plurality of load bearing surface pairs on both said right and left sides of said clamping body and means for applying opposing forces to each of said plurality of load bearing surface pairs.

12. A clamping device according to claim 9 wherein at least one of said rotary cams is positionally secured to the shaft on which it is journaled and wherein said cam is rotated by rotation of said shaft.

13. A clamping device according to claim 9 wherein a plurality of cams is positionally secured to a common shaft and wherein rotation of said shaft rotates all of said cams simultaneously.

14. A clamping device according to claim 9 wherein at least one of said cams is connected through a linkage to a nut which follows a screw which in turn follows a worm gear and wherein rotation of said worm gear causes said cam to rotate.

15. A clamping device according to claim 14 wherein rotation of a plurality of worm gears on a common shaft causes a plurality of cams to rotate simultaneously.

16. A clamping device according to claim 9 wherein actuation means are provided for simultaneously rotating a plurality of cams.

17. A clamping device according to claim 16 wherein at least one of the groups of cams associated with particular bearing surfaces are rotatable.

18. A clamping device according to claim 9 wherein at least one of said links is hingedly secured at at least one of its ends to one of said body members.

19. A clamping device according to claim 9 adapted to be opened and closed in clamshell-like fashion wherein said links on one side of said clamping body are hingedly secured at their upper and lower ends to said upper and lower body members respectively.

20. A clamping device according to claim 19 adapted to be opened and closed in clamshell-like fashion wherein said links on said other side of said clamping body are hingedly secured at their upper ends to said upper member.

21. A clamping device according to claim 9 wherein said bearing surfaces are concave saddles.

22. A clamping device according to claim 9 specifically adapted for joining tubular members and for sealing holes which may be in the walls thereof, said device further comprising a sealing means in said bore.

23. A clamping device for a cylindrical object comprising:
(a) a clamping body having a cylindrical bore for receiving an object to be clamped, said body being split longitudinally with respect to said bore, into first and second clamping members being adapted to be urged together into clamping relationship; said clamping body having at least two sides;
(b) at least one link having first and second ends respectively associated with at least one side of said first and second members of said clamping body; means for securing said first and second clamping members to one another connected to the other side of said clamping member;

(c) means for coupling said first and second ends of each such link to said associated members of said clamping body, said coupling means for at least said first end of each link including a cam which is movable to a predetermined position, whereby movement of said cam to said predetermined position moves said end of said link relative to its associated body member and forces said body members toward each other into clamping relationship.

24. A clamping device according to claim 23 wherein forces urging said body portions toward each other into clamping relationship are directed tangentially to the average stress line of said body.

25. A clamping device according to claim 23 wherein both of said coupling means for said first and second ends of each link comprise a cam.

26. A clamping device according to claim 23 wherein at least said first end of each link comprises an eye and wherein said coupling means for said link end includes, in assembly, a cam mounted on a shaft, said assembly of said cam and said shaft passing through said eye of said link.

27. A clamping device according to claim 26 wherein said shaft is journaled in said eye of said link, said cam is a rotary cam, and wherein rotation of said cam causes it to bear against said associated body member.

28. A clamping device according to claim 26 wherein said cam is a rotary cam which works in said eye of said link and wherein rotation of said cam causes said shaft to bear against said associated body portion.

29. A clamping device according to claim 23 including a plurality of cams associated with a plurality of links wherein all of said plurality of cams are simultaneously movable to said predetermined position.

30. A clamping device according to claim 23 wherein each link is of a substantially rectangular cross section.

31. A clamping device of claim 23 wherein each link projects outwardly from said clamping body at the midsection of said link.

32. A clamping device of claim 31 wherein said midsection of each of said links bears against said clamping body.

* * * * *